United States Patent [19]

Swinderman

[11] Patent Number: 4,917,231
[45] Date of Patent: Apr. 17, 1990

[54] CONSTANT ANGLE CONVEYOR BELT CLEANER

[75] Inventor: Robert T. Swinderman, Kewanee, Ill.

[73] Assignee: Martin Engineering Company, Neponset, Ill.

[21] Appl. No.: 340,876

[22] Filed: Apr. 20, 1989

[51] Int. Cl.⁴ ............................................. B65G 45/00
[52] U.S. Cl. .................................... 198/497; 198/499
[58] Field of Search ............... 198/497, 499; 15/256.5, 15/256.51, 256.6

[56] References Cited

U.S. PATENT DOCUMENTS

| 4,249,650 | 2/1981 | Stahura | 198/499 |
| 4,489,823 | 12/1984 | Gordon | 198/499 |
| 4,658,949 | 4/1987 | Reicks | 198/497 |
| 4,696,389 | 9/1987 | Schwarze | 198/499 |

FOREIGN PATENT DOCUMENTS

| 0692763 | 10/1979 | U.S.S.R. | 198/499 |
| 0882878 | 11/1981 | U.S.S.R. | 198/499 |
| 1234315 | 5/1986 | U.S.S.R. | 198/499 |
| 2055730 | 3/1981 | United Kingdom | 198/499 |

Primary Examiner—David A. Bucci
Assistant Examiner—D. Glenn Dayoan
Attorney, Agent, or Firm—Lee, Mann, Smith McWilliams & Sweeney

[57] ABSTRACT

A conveyor belt cleaner for removing residue from the surface of a conveyor belt is disclosed. The conveyor belt cleaner is radially adjustable through connection with a rotatable support member positioned generally transverse to the direction of conveyor belt travel. The conveyor belt cleaner includes a scraping blade having a curvilinear scraping surface. One edge of the curvilinear scraping surface is in contact with the conveyor belt. The curvilinear scraping surface is configured in a way such that the cleaning angle formed between a first line, tangent to the curvilinear scraping surface and extending through a point where the scraping surface edge is in contact with the conveyor belt, and a second line, either tangent or parallel to the surface of the conveyor belt and extending through the same point where the scraping surface edge contacts the conveyor belt, will remain constant as the conveyor belt cleaner is radially adjusted to compensate for wear to the scraping blade.

15 Claims, 2 Drawing Sheets

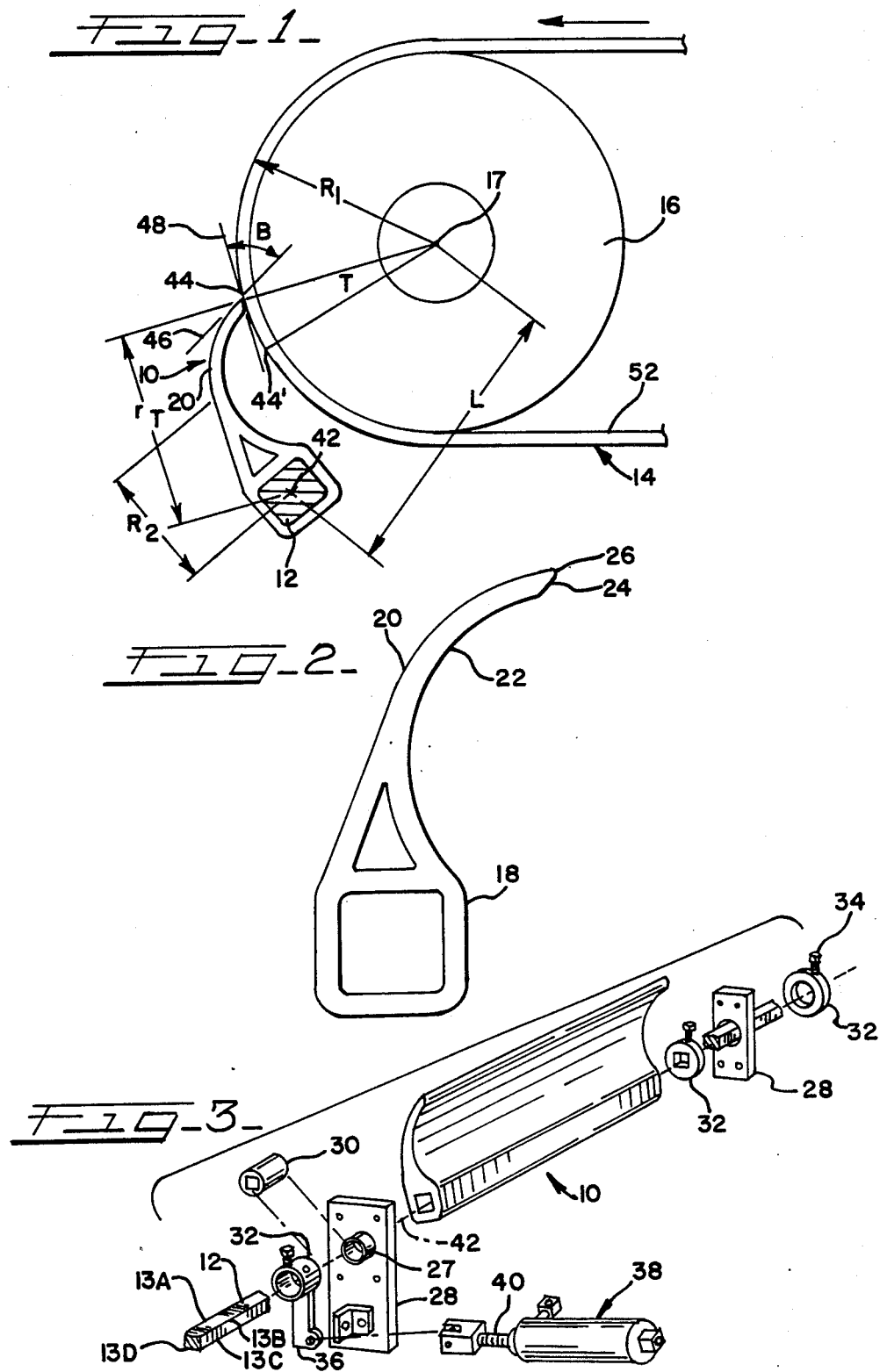

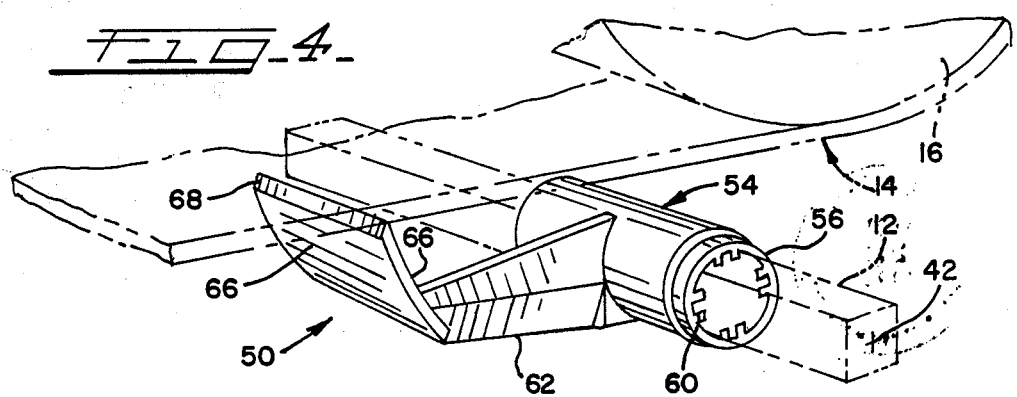
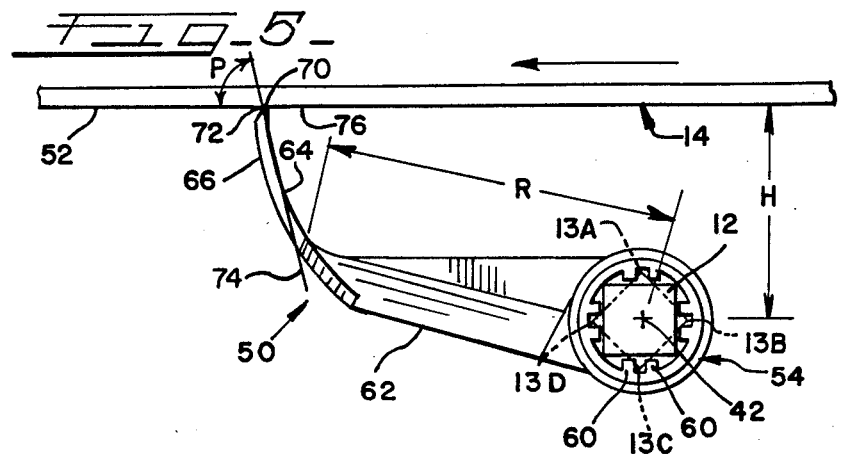
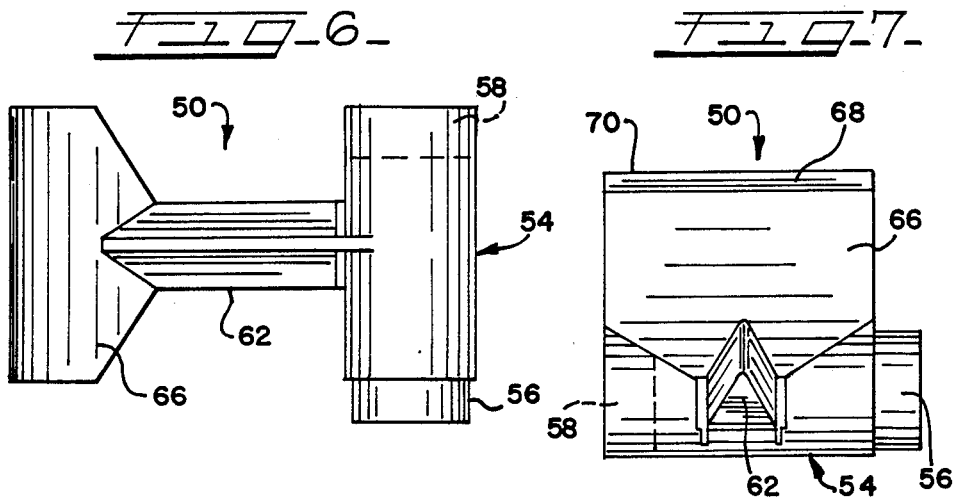

CONSTANT ANGLE CONVEYOR BELT CLEANER

BACKGROUND OF THE INVENTION

The present invention relates to scraper blades which are used to remove residual material clinging to the return run of a conveyor belt. It has been known in the prior art to provide either linearly or radially adjustable scraper blades. Radially adjustable scraper blades have had one disadvantage as compared with the linearly adjustable scraper blades in that as the blade of a radially adjustable scraper wears, and is adjusted accordingly, the angle between the conveyor belt and the scraper blade changes. While different cleaning angles may be found to be more desirable for differing situations, it is apparent that a radially adjustable scraper blade will operate with an optimum cleaning angle for only a small part of its life. Scraper blades which are radially adjustable are shown in U.S. Pat. Nos. 4,098,394, 4,359,150, 4,586,600 and 4,643,293. Scraper blades which are vertically adjustable are described in U.S. Pat. Nos. 4,249,650 and 4,696,389. Scraper blades which utilize a curvilinear shape are shown in U.S. Pat. Nos. 4,269,301, 4,489,823, 4,658,949 and 4,787,500. However, the prior art does not disclose a radially adjustable scraper blade having a curvilinear scraping surface configuration which maintains a constant cleaning angle with the conveyor belt as the scraper blade is adjusted radially.

SUMMARY OF THE INVENTION

The present invention provides a radially adjustable conveyor belt scraper blade which maintains a constant cleaning angle with the conveyor belt as the scraper blade is adjusted radially to compensate for wear to the scraper blade. Recent studies by the United States Bureau of Mines show that two important variables in consistent conveyor belt cleaning are the contact pressure between the belt and the blade, which is a function of blade thickness, and a constant blade angle in relation to the conveyor belt. While various cleaning angles may be selected, the present invention will maintain the selected cleaning angle throughout the wear life of the radially adjustable conveyor belt cleaner by the use of a predetermined configuration of the curvilinear scraping surface of the scraping blade. The present invention will also maintain a constant area of contact between the conveyor belt cleaner and the conveyor belt.

The invention may be used with either doctor blades which are used to scrape the conveyor belt at the head pulley, or with the arm and blade type which are used to scrape the return run of the conveyor belt. The preferred configuration for the curvilinear surface of an arm and blade unit is that of an involute of a circle. The preferred configuration for the scraping surface of a doctor blade is defined by a set of formulas that will be disclosed below. The use of these respective scraper surface configurations will permit a scraper blade to be radially adjusted as it wears while maintaining a constant scraping angle between the surface of the conveyor belt and a tangent to the scraping surface at the point where the scraping surface contacts the conveyor belt.

Other surface configurations may also be used with either doctor blade or arm and blade units. One such configuration is in the shape of a segment of a circle, the center of the circle being aligned with the rotational axis about which the scraper blade is rotationally adjustable. However, this circular scraper surface configuration is not preferred over the two configurations discussed earlier. Other configurations for example may involve regular curves that approximate the theoretically correct relationship for purposes of ease of manufacture. Another configuration would be combinations of curves and blade thickness which would achieve a constant cross-sectional area in contact with the belt. This may be required for structural or aesthetic reasons. Another modification may be made to approximate deflection due to dynamic loading of the conveyor belt scraper blade.

DESCRIPTION OF THE DRAWINGS

FIG. 1 is a side elevation view of a conveyor belt and the scraper blade of the present invention of the doctor blade type.

FIG. 2 is an enlarged side elevational view of the scraper blade.

FIG. 3 is an exploded perspective view of the scraper blade adjustment assembly.

FIG. 4 is a perspective view of an alternative embodiment of the present invention showing a scraper blade of the arm and blade type and the return run of the conveyor belt.

FIG. 5 is a side elevational view of the alternative embodiment of the scraper blade and the return run of the conveyor belt.

FIG. 6 is a plan view of the alternative embodiment of the scraper blade.

FIG. 7 is a front elevational view of the alternative embodiment of the scraper blade.

DESCRIPTION OF THE PREFERRED EMBODIMENT

FIG. 1 shows a conveyor belt cleaning arrangement in which a scraper blade 10 of the doctor blade type is mounted on a rotatable support member 12 in scraping engagement with the outer surface of a conveyor belt 14 which is carried around a roller or head pulley 16 mounted at one end of a conveyor. The arrow in FIG. 1 indicates that roller 16 is rotating about a center axis 17 in a counterclockwise direction carrying the conveyor belt 14 with it.

The scraper blade 10, better illustrated in FIG. 2, includes a square annular hollow base 18 with a curvilinear scraping face 20 and a rear face 22. A tip face 24 extends between the rear face 22 and the scraping face 20, the tip face 24 and the scraping face 20 meeting at a scraping edge 26. The scraper blade 10 is of sufficient width to scrape the entire width of the conveyor belt 14. FIG. 3 illustrates a single blade 10, but an arrangement in which a plurality of narrow blades abutting against each other may also be used.

The scraper blade 10 is supported and radially adjusted by the assembly shown in FIG. 3. A square support member 12 passes through the annular base 18 and through apertures 27 within brackets 28. One bracket 28 is positioned at either end of the scraper blade 10 and attached to the conveyor. A round collar 30 having a square opening to accomodate the support member 12 is positioned dwithin each aperture 27. Locking collars 32 are placed around the support member 12 on both sides of one bracket 28 and are fastened thereto by locking screws 34. One locking collar 32, having a lever arm 36 affixed thereto, is positioned around the support member 12 on the outside of the remaining bracket 28 and is fastened in place by locking screw 34. A pneumatic cylinder 38 is affixed between the conveyor and the lever arm 36. When the ram 40 of the cylinder 38 is extended, the scraper edge 26 is rotated towards the conveyor belt 14 about a rotational axis 42.

The scraping edge 26 contacts the conveyor belt 14 along a line 44. The cleaning angle B shown in FIG. 1 is the included angle defined between a first line 46 and a second line 48. The first line 46 is tangent to the scraping surface 20 and passes through a point in the line of contact 44 defined between the blade 10 and the belt 14. The second line 48 is tangent to the conveyor belt 14 and passes through the same point in the line of contact 44 as does the first line 46.

The shape of the curvilinear scraping face 20 is formed according to the following formulas in an X-Y coordinate system with the trigonometric functions being calculated in radians:

$$X_T = r_T \cos(KE_T)$$
$$Y_T = r_T \sin(KE_T)$$
wherein
$$r_T = R_2 + 2R_1 \sin(KT/2)$$
= the variable radius of the scraping edge 26

$$R_2 = \frac{L \sin(KF)}{\sin(K(90+B))}$$
= the distance from the rotational axis 42 to the start of the scraping surface 20

$$F = 90 - (P + B)$$

$$P = \frac{\arcsin[(R_1/L)\sin(K(90+B))]}{K}$$

$E_T = E_{T-S} + D_T$ = the angle between $r_T$ and the X axis
$D_T = [180 - B_T - C_T]$ = the angle between $r_T$ and $r_{T-S}$
$B_T = [90 + B - A_T]$ = the angle between $r_T$ and the scraping surface 20

$$A_T = \frac{\arccos[(R_1^2 + r_T^2 - L^2)/2R_1 r_T]}{K} = \text{the angle between } R_1 \text{ and } r_T$$

$$C_T = -\frac{\arcsin[((r_T+S)/r_T)\sin(KB_T)]}{K} + 180$$
= the angle between the scraping surface 20 and $r_{T-S}$ As an example:
- $R_1$ = radius of the roller 16 plus the thickness of the conveyor belt 14 = 50.8 mm
- B = the cleaning angle between the tangent 46 to the scraping face 20 and the tangent 48 to the conveyor belt 14 = 15°
- L = distance between the center axis 17 of the pulley 16 and the axis of rotation 42 of the scraper blade 10 = 70.8 mm
- T = the angle, as measured about the center axis 17, between the initial position 44 of the line of contact and any adjusted position 44' of the line of contact
- S = an increment of 10°
- K = pi/180 = 3.1416/180 = 0.0175

| T | $r_T$ | $A_T$ | $B_T$ | $C_T$ | $D_T$ | $E_T$ | $X_T$ | $Y_T$ |
|---|---|---|---|---|---|---|---|---|
| 0 | 37.89 | 105 | 0 | 180 | 0 | 0 | 37.89 | 0 |
| 10 | 46.74 | 92.98 | 12.02 | 165.68 | 2.30 | 2.30 | 46.71 | 1.88 |
| 20 | 55.53 | 83.37 | 21.63 | 154.78 | 3.59 | 5.89 | 55.24 | 5.70 |
| 30 | 64.19 | 75 | 30 | 145.54 | 4.46 | 10.35 | 63.14 | 11.54 |

-continued

| T | $r_T$ | $A_T$ | $B_T$ | $C_T$ | $D_T$ | $E_T$ | $X_T$ | $Y_T$ |
|---|---|---|---|---|---|---|---|---|
| 40 | 72.64 | 67.33 | 37.67 | 137.16 | 5.17 | 15.53 | 69.99 | 19.45 |
| 50 | 80.83 | 60.04 | 44.96 | 129.16 | 5.88 | 21.40 | 75.25 | 29.50 |
| 60 | 88.69 | 52.91 | 52.09 | 121.19 | 6.72 | 28.13 | 78.22 | 41.81 |

As the tip face 24 wears down a new scraping edge 26 is formed and the scraper blade 10 is radially adjusted about the rotational axis 42 to keep the scraping edge 26 in contact with the conveyor belt 14. As the scraper blade 10 is radially adjusted, the line of contact 44 moves along the conveyor belt 14 in a direction towards the rotational axis 42 to a rotationally adjusted position 44', however the cleaning angle B will remain constant and the area of contact between the scraper blade 10 and the conveyor belt 14 will also remain constant.

FIGS. 4–7 show an alternative embodiment in which a scraper blade 50 of the arm and blade type is mounted on a rotatable support member 12 in scraping engagement with the outer surface of the conveyor belt 14 uner the conveyor belt's return run 52. The arrow in FIG. 5 indicates the direction of conveyor belt travel.

The scraper blade 50 shown in FIGS. 4–7 includes a round annular hollow base 54 which has a protruding portion 56 at one end and a recessed portion 58 at the other end. The protruding portion 56 and the recessed portion 58 are sized so that when two scraper blades 50 are positioned side by side, the protruding portion 56 of the first scraper blade 50 will fit closely within the recessed portion 58 of the second scraper blade 50. Eight ribs 60 are positioned on the interior surface of the annular base 54. The ribs 60 are positioned in four pairs at 90° angles between each pair of ribs, each pair of ribs having two ribs 60 spaced so as to allow a square section support member 12 to be inserted as shown in FIG. 5 for English standard square sections or, as shown in phantom, for metric standard square sections with the corners 13 A, B, C and D of the support member 12 being supported between the ribs 60. An arm 62 extends outwardly from the annular base 54 to a curvilinear scraping face 64 and a rear face 66. The scraping face 64 and the rear face 66 are connected by the tip face 68, which contacts the conveyor belt 14 along a line 72.

The cleaning angle P shown in FIG. 5 is the included angle defined between a first line 74 and a second line 76. The first line 74 is tangent to the scraping face 64 and passes through a point in the line of contact 72 where the scraping face 64 contacts the belt 14. The second line 76 is tangent to the conveyor belt 14 and passes through the same point in the line of contact 72 as does the first line 74. The amount of wear with a constant angle design is equal to the length of the defined curve utilized in the design.

The curvilinear scraping face 64 is in the shape of an involute of a circle which is defined by the following equations in an X-Y coordinate system with the trigonometric functions being calculated in radians:

$$X_T = R[\cos(KT) + KT \sin(KT)]$$

$$Y_T = R[\sin(KT) - KT \cos(KT)]$$

$$P = (180/\pi) \tan V$$

where
$$V = \arccos[R/(x^2 + H^2)^{\frac{1}{2}}]$$

x = the $X_T$ coordinate for the angle T where $Y_T$ equals H, which is the X coordinate of the line of contact 72

R = the distance from the rotational axis 42 to the start of the scraping face 64 = 95 mm T = the angle through which the scraper blade is rotated about the rotational axis 42 = 0°–90°

H = the distance between the rotational axis 42 and the conveyor belt 14 = 90 mm K = pi/180 = 3.1416/180 = 0.0175

| T | $X_T$ | $Y_T$ | P = 75.201° |
|---|---|---|---|
| 0 | 95 | 0 | |
| 10 | 96.436 | 0.168 | |
| 20 | 100.613 | 1.331 | |
| 30 | 107.143 | 4.422 | |
| 40 | 115.406 | 10.259 | |
| 50 | 124.572 | 19.485 | |
| 60 | 133.855 | 32.531 | |
| 70 | 141.557 | 49.574 | |
| 75.201 | 144.818 | 60.0 | |
| 80 | 147.126 | 70.523 | |
| 90 | 149.226 | 95 | |

As the tip face 68 wears down a new scraping edge 70 is formed and the scraper blade 50 is radially adjusted as it wears about the rotational axis 42 to keep the scraping edge in contact with the conveyor belt 14. As the scraper blade 50 is radially adjusted, the line of contact 72 moves along the conveyor belt 14 in a direction towards the rotational axis 42, however the cleaning angle P remains constant and the area of contact between the scraper blade 50 and the belt 14 also remains constant.

Thus it has been shown that the present invention provides a radially adjustable conveyor belt scraper blade which maintains a constant cleaning angle with the conveyor belt throughout the wear life of the scraper blade.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A conveyor belt cleaner scraper blade for cleaning the surface of a conveyor belt, said scraper blade adapted to be mounted on a rotatable support member positioned generally transverse to the direction of conveyor belt travel, said scraper blade including a curvilinear surface having a scraping edge at one end for contacting said conveyor belt along a line of contact, adjustment means for rotating and radially adjusting said scraper blade either into or out of contact with said conveyor belt through rotation of said support member, said curvilinear surface having a configuration such that a cleaning angle is formed between a first line tangent to said curvilinear surface and passing through a point in said line of contact, and a second line tangent to said conveyor belt and passing through said same point in said line of contact as said first line, said curvilinear surface having a configuration corresponding to an involute of a circle, whereby said cleaning angle remains constant as the scraper blade wears and as the position of said scraper blade is radially adjusted throughout the wear life of said scraper blade.

2. The conveyor belt cleaner scraper blade of claim 1 wherein the area of contact between said scraper blade and said conveyor belt remains constant as said scrapper blade is radially adjusted.

3. The conveyor belt cleaner scraper blade of claim 1 wherein said line of contact moves relative to said conveyor belt surface along said conveyor belt surface as the scraper blade is radially adjusted.

4. The conveyor belt cleaner scraper blade of claim 1 including a base having a round annular opening with eight protruding ribs extending from within said annular opening to engage a square support member having four edges, said ribs being grouped in four pairs of ribs, each pair of ribs having two ribs spaced closely together and each pair of ribs being space 90° from each other, said support member engages said base by having said edges of said support member located either between said ribs of said pair of ribs or alternatively between each said pair of ribs.

5. A conveyor belt cleaner scraper blades as in claim 1 including a hollow base member adapted for securement to said rotatable support member said base member defining, at one end, a protruding section of lesser diameter than the external diameter of said base and defining at said other end, a recessed section within said base member such that when a plurality of base members are mounted on said support member adjacent each other said protruding section of one base member is adapted to be inserted within said recessed section of said adjacent base member.

6. A conveyor belt cleaner scraper blade for cleaning the surface of a conveyor belt, said scraper blade adapted to be mounted on a rotatable support member positioned generally transverse to the direction of conveyor belt travel, said scraper blade including a curvilinear surface having a scraping edge at one end for contacting said conveyor belt along a line of contact, adjustment means for rotating and radially adjusting said scraper blade either into or out of contact with said conveyor belt through rotation of said support member, said curvilinear surface having a configuration such that a cleaning angle is formed between a first line tangent to said curvilinear surface and passing through a point in said line of contact, and a second line tangent to said conveyor belt and passing through said same point in said line of contact as said first line, said curvilinear surface having a configuration corresponding to the coordinates determined from the following equations in a X-Y coordinate system with the trigonometric functions being calculated in radians:

$$X_T = r_T \cos(KE_T)$$
$$Y_T = r_T \sin(KE_T)$$

wherein $$r_T = R_2 + 2R_1 \sin(KT/2)$$
$$R_2 = \frac{L \sin(KF)}{\sin(K(90 + B))}$$
$$F = 90 - (P + B)$$

$$P = \frac{\arcsin[(R_1/L) \sin(K(90 + B))]}{K}$$

$$E_T = E_{T-S} + D_T$$
$$D_T = [180 - B_T - C_T]$$
$$B_T = [90 + B - A_T]$$
$$A_T = \frac{\arccos[(R_1^2 + r_T^2 - L^2)/2R_1 r_T]}{K}$$

$$C_T = -\frac{\arcsine\left[((r_T+_S)/r_T)\sin(KB_T)\right]}{K} + 180$$

where
R₁=radius of the roller plus the thickness of the conveyor belt,
B=the cleaning angle between the tangent to the scraping face and the tangent to the conveyor belt,
L=distance between the center axis of the roller and the axis of rotation of the scraper blade,
T=the angle through which the line of contact moves as the scraper blade is adjusted for wear as measured from the center axis of the roller,
S=an increment of the range of the angles T,
K=pi/180=3.1416/180=0.0175,
whereby said cleaning angle remains constant as the scraper blade wears and as the position of said scraper blade is radially adjusted throughout the wear life of said scraper blade.

7. The conveyor belt cleaner scraper blade of claim 6 wherein the area of contact between said scraper blade and said conveyor belt remains constant as said scraper blade is radially adjusted.

8. The conveyor belt cleaner scraper blade of claim 6 wherein said line of contact moves relative to said conveyor belt surface along said conveyor belt surface as the scraper blade is radially adjusted.

9. The conveyor belt cleaner scraper blade of claim 6 including a base having a round annular opening with eight protruding ribs extending from within said annular opening to engage a square support member having four edges, said ribs being grouped in four pairs of ribs, each pair of ribs having two ribs spaced closely together and each pair of ribs being spaced 90° from each other, said support member engages said base by having said edges of said support member located either between said ribs of said pair of ribs or alternatively between each said pair of ribs.

10. A conveyor belt cleaner scraper blade as in claim 6 including a hollow base member adapted for securement to said rotatable support member said base member defining, at one end, a protruding section of lesser diameter than the external diameter of said base and defining at said other end, a recessed section within said base member such that when a plurality of base members are mounted on said support member adjacent each other said protruding section of one base member is adapted to be inserted within said recessed section of said adjacent base member.

11. A conveyor belt cleaner scraper blade for cleaning the surface of a conveyor belt, said scraper blade adapted to be mounted on a rotatable support member positioned generally transverse to the direction of conveyor belt travel, said scraper blade including a curvilinear surface having a scraping edge at one end for contacting said conveyor belt along a line of contact, adjustment means for rotating and radially adjusting said scraper blade either into or out of contact with said conveyor belt through rotation of said support member, said curvilinear surface having a configuration such that a cleaning angle is formed between a first line tangent to said curvilinear surface and passing through a point in said line of contact, and a second line tangent to said conveyor belt and passing through said same point in said line of contact as said first line, said curvilinear surface having a configuration corresponding to an arc of a circle, said adjustment means rotating and radially adjusting said scraper blade about the center of said arc of a circle, whereby said cleaning angle remains constant as the scraper blade wears and as the position of said scraper blade is radially adjusted throughout the wear life of said scraper blade.

12. The conveyor belt cleaner scraper blade of claim 11 wherein said line of contact remains stationary relative to said conveyor belt during radial adjustment of said scraper blade.

13. The conveyor belt cleaner scraper blade of claim 11 wherein the area of contact between said scraper blade and said conveyor belt remains constant as said scraper blade is radially adjusted.

14. The conveyor belt cleaner scraper blade of claim 11 including a base having a round annular opening with eight protruding ribs extending from within said annular opening to engage a square support member having four edges, said ribs being grouped in four pairs of ribs, each pair of ribs having two ribs spaced closely together and each pair of ribs being spaced 90° from each other, said support member engages said base by having said edges of said support member located either between said ribs of said pair of ribs or alternatively between each said pair of ribs.

15. A conveyor belt cleaner scraper blade as in claim 11 including a hollow base member adapted for securement to said rotatable support member said base member defining, at one end, a protruding section of lesser diameter than the external diameter of said base and defining at said other end, a recessed section within said base member such that when a plurality of base members are mounted on said support member adjacent each other said protruding section of one base member is adapted to be inserted within said recessed section of said adjacent base member.

* * * * *